(12) United States Patent
Lin et al.

(10) Patent No.: US 7,995,907 B2
(45) Date of Patent: Aug. 9, 2011

(54) CAMERA

(75) Inventors: Yi-Chang Lin, Taichung (TW); Shuo-Chi Chia, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 136 days.

(21) Appl. No.: 12/395,751

(22) Filed: Mar. 2, 2009

(65) Prior Publication Data

US 2009/0310952 A1    Dec. 17, 2009

(30) Foreign Application Priority Data

Jun. 11, 2008 (TW) .............................. 97121695 A

(51) Int. Cl.
*G03B 17/00* (2006.01)
(52) U.S. Cl. .......................................... 396/48; 396/55
(58) Field of Classification Search .................... 396/48, 396/55, 263; 348/208.12
See application file for complete search history.

(56) References Cited

U.S. PATENT DOCUMENTS

| 2008/0100253 A1* | 5/2008 | Kiyamura ..................... 318/696 |
| 2008/0152333 A1* | 6/2008 | Yamasaki et al. ............... 396/55 |
| 2008/0211922 A1* | 9/2008 | Murashima et al. ..... 348/208.99 |

* cited by examiner

*Primary Examiner* — W. B. Perkey
(74) *Attorney, Agent, or Firm* — Thomas|Kayden

(57) ABSTRACT

A camera having a shutter button, a photo sensor array, an anti-shake module controlled by an anti-shake enable signal, and a mechanical shutter. By pressing the shutter button, a first operation and a second operation are provided to trigger an auto-focus enable signal and an image exposure control signal, respectively. The anti-shake enable signal is enabled when the auto-focus enable signal has been triggered and the image exposure control signal is disabled or has just been triggered. The photo sensor array performs image exposure according to the image exposure control signal. The mechanical shutter is disabled and closed after the image exposure control signal is triggered for exposure period.

18 Claims, 3 Drawing Sheets

CAMERA

This Application claims priority of Taiwan Patent Application No. 097121695, filed on Jun. 11, 2008, the entirety of which is incorporated by reference herein.

BACKGROUND OF THE INVENTION

1. Field of the Invention

The present invention relates to cameras, and in particular relates to anti-shake cameras.

2. Description of the Related Art

Anti-shake is important for camera designs, as it is difficult for users to hold a camera steadily. Should a user move, such as breathing heavily or pressing the shutter button too hard, during image capture, the resulting image may be blurred.

Conventional anti-shake techniques include optical image stabilization and digital image stabilization and so on. Optical image stabilization mechanisms use a floating lens element to compensate for camera shake. Digital image mechanisms use a specially designed chip to correct blurred images.

In an optical image stabilization system, the anti-shake module usually comprises a detector, an image corrector, and a lens driver. When detecting camera shake, the detector outputs the detected signal to the corrector to evaluate the vibration. Then, based on the evaluated vibration, the lens driver adjusts the position of the floating lens element to compensate for the camera shake. In another anti-shake technique named CCD anti-shake, the lens is still and the anti-shake mechanism is realized by moving the camera sensor (such as a CCD).

BRIEF SUMMARY OF THE INVENTION

The invention discloses cameras. A camera comprises a shutter button, a photo sensor array, an anti-shake module and a mechanical shutter. There are two operations that are triggered by pressing the shutter button. The first operation triggers an auto-focus enable signal. The second operation triggers an image exposure control signal. The first operation is prior to the second operation. When the auto-focus enable signal has been triggered and the image exposure control signal is disabled or has just been triggered, an anti-shake enable signal is triggered to enable the anti-shake module. The photo sensor array performs image exposure according to the image exposure control signal. The mechanical shutter is disabled and closed when the image exposure control signal has been enabled for an exposure period.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
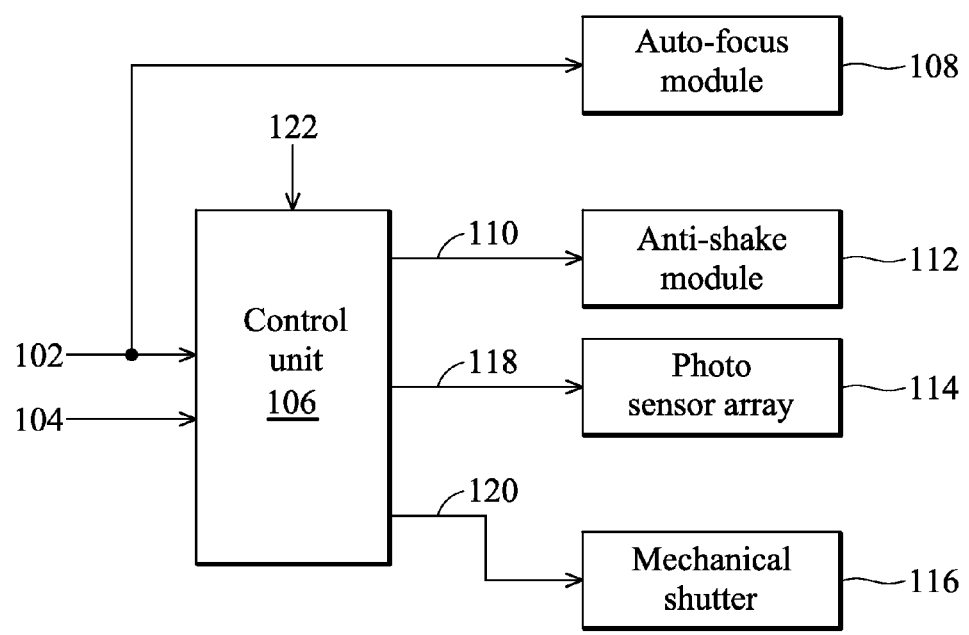
FIG. 1A depicts an exemplary embodiment of the cameras of the invention.

FIG. 1A depicts an exemplary embodiment of the camera of the invention. In addition to the components shown in FIG. 1A, the camera further comprises a shutter button. At least two operations are provided by pressing the shutter button. The first operation triggers an auto-focus enable signal 102. The second operation triggers an image exposure control signal 104. The first operation is generally prior to the second operation. Thus, before the image exposure control signal 104 is triggered, the auto-focus enable signal 102 is triggered to enable an auto-focus module 108 to perform an auto-focus procedure.

The auto-focus enable signal 102 and the image exposure control signal 104 are further sent to a control unit 106. According to the auto-focus enable signal 102 and the image exposure control signal 104, the control unit 106 triggers an anti-shake enable signal 110 to enable an anti-shake module 112. The control unit 106 may trigger the anti-shake enable signal 110 when the auto-focus enable signal 102 has been triggered and the image exposure control signal 104 is disabled. In another exemplary embodiment of the invention, the control unit 106 may trigger the anti-shake enable signal 110 when the image exposure control signal 104 is triggered.

With the enabled anti-shake module 112, the photo sensor array 114 can clearly sense images. After the image exposure control signal 104 is enabled for an exposure period, the mechanical shutter 116 may be disabled and closed to shelter the photo sensor array 114 from light.

In an exemplary embodiment of the invention, the control unit 106 may disable the anti-shake enable signal 110 when the auto-focus enable signal 102 is disabled or after the auto-focus enable signal 102 is disabled. In another exemplary embodiment of the invention, the control unit 106 may disable the anti-shake enable signal 110 according to the image exposure control signal 104. The control unit 106 may disable the anti-shake enable signal 110 when the image exposure control signal 104 is disabled or after the image exposure control signal 104 is disabled. In another exemplary embodiment of the invention, the control unit 106 may disable the anti-shake enable signal 110 according to the operation of the mechanical shutter 116. The control unit 106 may disable the anti-shake enable signal 110 when the mechanical shutter 116 is disabled and closed or after the mechanical shutter 116 is disabled and closed.

A photo sensor array 114 comprises a plurality of photo sensors. Before capturing the next image, the photo sensors have to be reset (such as discharging of the photo sensors). In some embodiments, the control unit 106 generates a reset signal 118 according to the image exposure control signal 104. The reset signal 118 resets the photo sensors of the photo sensor array 114.

The control signal 120 for enabling the mechanical shutter 116 may be triggered according to a power signal 122 of the camera or may be triggered according to the image exposure control signal 104.

To summarize, the invention not only discloses cameras with the anti-shake module 112, but also provides several control schemes of the anti-shake enable signal 110. Thus, the power consumption of the anti-shake module 112 is efficiently reduced.

Figure 1B:
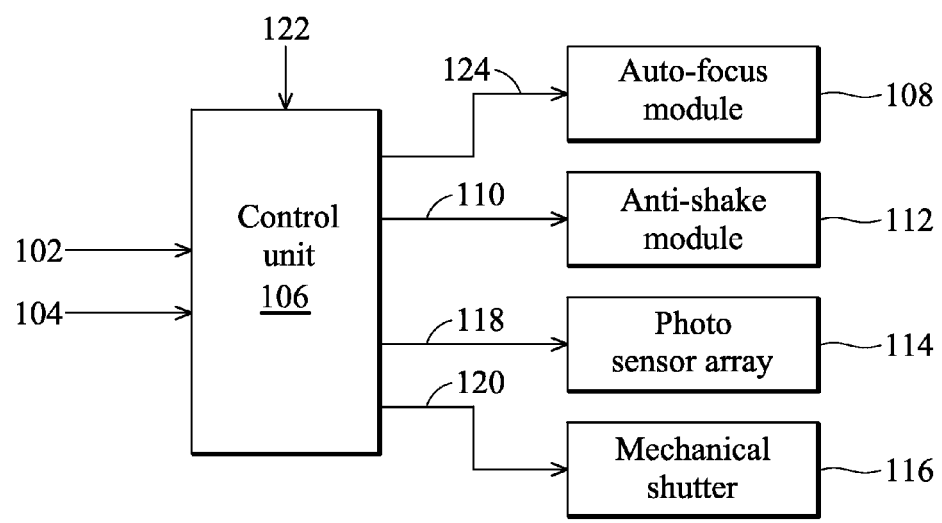
FIG. 1B depicts another exemplary embodiment of the cameras of the invention.

FIG. 1B illustrates another embodiment of the invention. Compared with FIG. 1A, the auto-focus module 108 of FIG. 1B is enabled by a signal 124 rather than directly by the auto-focus enable signal 102. The signal 124 is generated by the control unit 106 and is dependent on the auto-focus enable signal 102.

Figure 2:
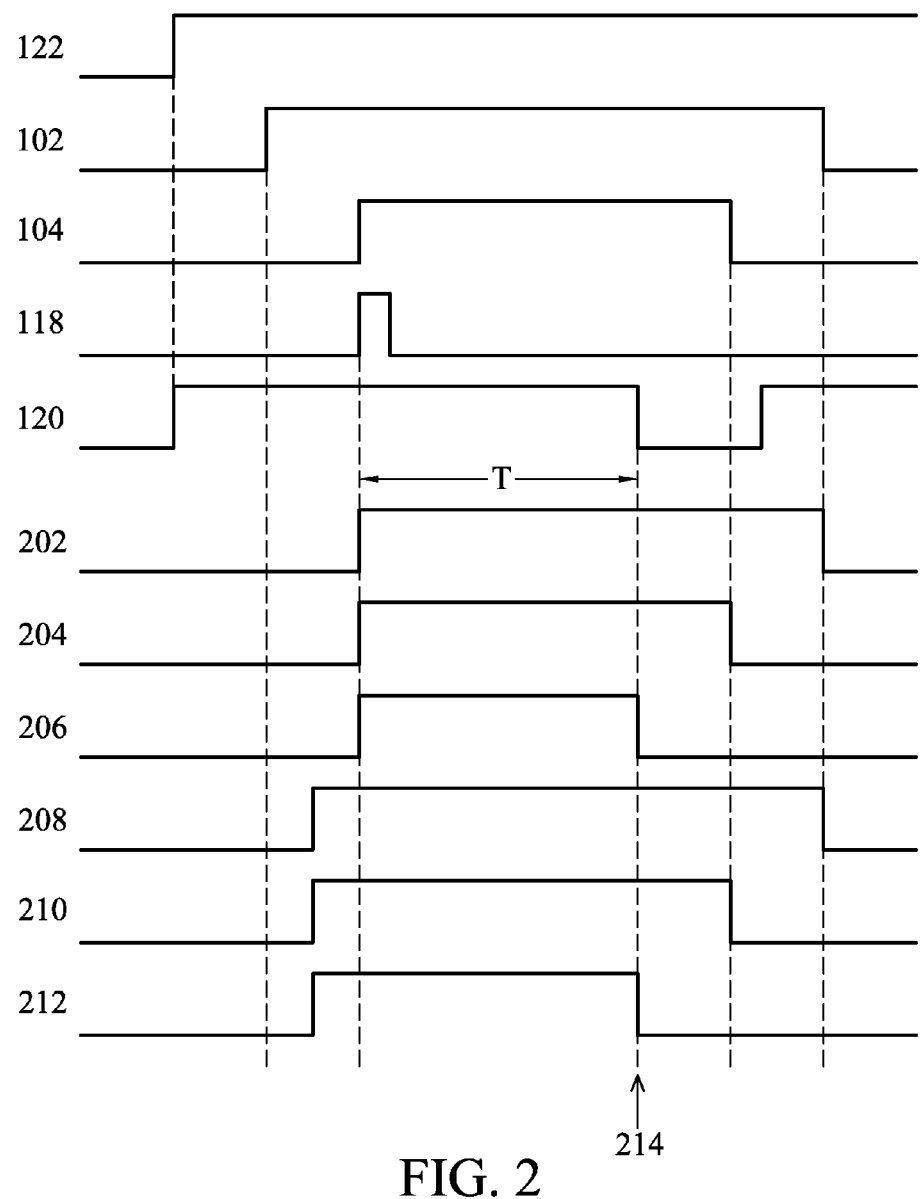
FIG. 2 shows waveforms of exemplary embodiments of the anti-shake enable signal of the invention.

Based on an exemplary embodiment of the invention, FIG. 2 shows waveforms of the power signal 122, the auto-focus enable signal 102, the image exposure control signal 104, the reset signal 118 and the control signal 120, and uses waveforms 202-212 to show several exemplary embodiments of the anti-shake enable signal 110. When the power signal 122 is enabled, the control signal 120 may be triggered to enable the mechanical shutter 116. The user may press the shutter button to start the first operation, which triggers the auto-focus enable signal 102 to enable the auto-focus module 108 to perform an auto-focus procedure. After the auto-focus procedure, the user may press the shutter button again to start the second operation which triggers the image exposure control signal 104. When the image exposure control signal 104 is triggered, a reset signal 118 may be triggered accordingly. Referring to FIG. 2, the reset signal 118 may be alerted by a pulse when being triggered. According to the reset signal 118, the photo sensors of the photo sensor array 114 are reset for capturing images. The control signal 120 of the mechanical shutter 116 may be disabled to disable and close the mechanical shutter 116 when the image exposure control signal 104 has been enabled for an exposure period T.

The invention provides several control schemes for the anti-shake enable signal (signal 110 of FIGS. 1A and 1B). Waveforms 202-212 show different exemplary embodiments of the anti-shake enable signal (signal 110 of FIGS. 1A and 1B).

The anti-shake enable signal shown by waveform 202 is triggered when the image exposure control signal 104 is triggered, and is disabled when the auto-focus enable signal 102 is disabled. The anti-shake enable signal shown by waveform 204 is triggered when the image exposure control signal 104 is triggered, and is disabled when the image exposure control signal 104 is disabled. The anti-shake enable signal shown by waveform 206 is triggered when the image exposure control signal 104 is triggered, and is disabled when the control signal 120 of the mechanical shutter 116 is disabled.

Referring to the waveforms 208, 210 and 212, the anti-shake enable signal is triggered when the auto-focus enable signal 102 has been triggered and the image exposure control signal 104 is still disabled.

Furthermore, the anti-shake enable signal (signal 110 of FIGS. 1A and 1B) is not to be limited to being disabled when the signal 102, 104 or 120 is disabled. There are other designs for disabling the anti-shake enable signal. For example, the anti-shake enable signal (signal 110 of FIGS. 1A and 1B) may be disabled at any instant after a time label 214 shown in FIG. 2. The time label 214 indicates that that the control signal 120 is disabled.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera, comprising:
    a shutter button, pressed to trigger a first and a second operation, wherein the first operation triggers an auto-focus enable signal, the second operation triggers an image exposure control signal, and the first operation is prior to the second operation and, between the start of the first operation and the start of the second operation is a first time interval;
    a control unit, operated according to the auto-focus enable signal and the image exposure signal;
    a photo sensor array, reset by a reset signal that the control unit generates according to the image exposure signal for performing image exposure;
    an anti-shake module, enabled and disabled by an anti-shake enable signal triggered and disabled by the control unit, wherein the anti-shake enable signal is triggered when the auto-focus enable signal has been triggered by a second time interval that is not longer than the first time interval; and
    a mechanical shutter, enabled and disabled by a control signal triggered and disabled by the control unit, wherein the mechanical shutter is disabled and closed when the image exposure control signal has been triggered by a third time interval,
    wherein the control unit disables the anti-shake enable signal and the control signal concurrently.

2. The camera as claimed in claim 1, further comprising a control unit which is operable to trigger the anti-shake enable signal according to triggering of the image exposure control signal.

3. The camera as claimed in claim 2, wherein the second time interval equals to the first time interval.

4. The camera as claimed in claim 2, wherein the control unit further triggers a reset signal according to the image exposure control signal.

5. The camera as claimed in claim 4, wherein the photo sensor array comprises a plurality of photo sensors which are reset by the reset signal.

6. The camera as claimed in claim 2, wherein the anti-shake enable signal is disabled according to disabling and closing of the mechanical shutter.

7. The camera as claimed in claim 6, wherein anti-shake enable signal is disabled after being enabled for the third time interval.

8. The camera as claimed in claim 3, wherein the anti-shake enable signal is disabled according to disabling and closing of the mechanical shutter.

9. The camera as claimed in claim 8, wherein anti-shake enable signal is disabled after being enabled for the third time interval.

10. The camera as claimed in claim 1, wherein the anti-shake enable signal is disabled according to disabling of the image exposure control signal.

11. The camera as claimed in claim 2, wherein the anti-shake enable signal is disabled according to disabling of the image exposure control signal.

12. The camera as claimed in claim 3, wherein the anti-shake enable signal is disabled according to disabling of the image exposure control signal.

13. The camera as claimed in claim 1, wherein the anti-shake enable signal is disabled according to disabling of the auto-focus signal.

14. The camera as claimed in claim 2, wherein the anti-shake enable signal is disabled according to disabling of the auto-focus signal.

15. The camera as claimed in claim 3, wherein the anti-shake enable signal is disabled according to disabling of the auto-focus signal.

16. The camera as claimed in claim 1, wherein the anti-shake enable signal is triggered when the auto-focus enable signal has been triggered and the image exposure control signal is still disabled.

17. The camera as claimed in claim 16, wherein the anti-shake enable signal is disabled according to disabling of the image exposure control signal.

18. The camera as claimed in claim 16, wherein the anti-shake enable signal is disabled according to disabling of the auto-focus signal.

* * * * *